United States Patent Office 3,373,689
Patented Mar. 19, 1968

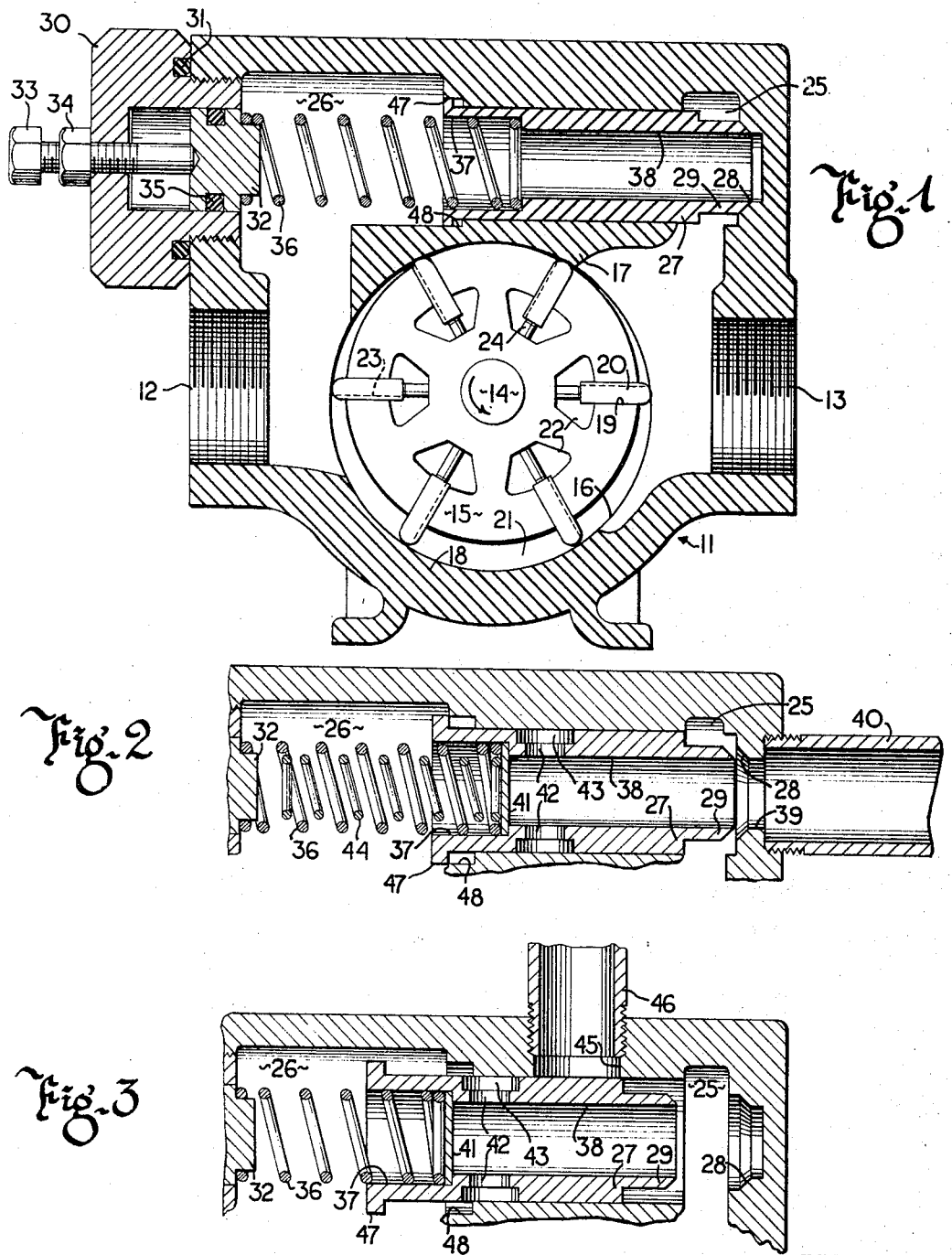

3,373,689
POSITIVE DISPLACEMENT PUMP
Virgil A. Brunson, Grand Rapids, Mich., assignor to Dover Corporation, Grand Rapids, Mich., a corporation of Delaware
Filed June 8, 1966, Ser. No. 556,040
10 Claims. (Cl. 103—42)

ABSTRACT OF THE DISCLOSURE

A positive displacement pump having a relief valve for bypassing liquid from the outlet side to the inlet side of the pump to limit the pressure on the outlet side, comprising a valve chamber having a cylindrical portion, a valve member having a cylindrical portion that has a sliding fit in such portion of the valve chamber so as to separate one end of the valve chamber from the other end, an open connection between one end of the valve chamber and the inlet side of the pump, an open connection between the other end of the valve chamber and the outlet side of the pump, a valve seat which is located in the end wall of such other end of the valve chamber and forms a connection between such other end of the valve chamber and the inlet side of the pump, an extension on the valve member which is of lesser transverse sectional area than said cylindrical portion of the valve member and which is engageable with the seat to close the connection between such other end of the valve chamber and the inlet side of the pump, and a spring which holds the extension against the seat in opposition to normal pump pressure acting upon the differential area and which is weak enough so that when the entire output of the pump is flowing through the valve, the unit pressure acting upon the increased area to hold the extension displaced from the seat is not substantially greater than the unit pressure which was required to start the displacement of the extension from the seat.

---

The invention relates to a positive displacement pump, and more particularly to such a pump having a relief valve for bypassing liquid from the outlet side to the inlet side of the pump in order to limit the pressure on the outlet side.

It is customary to provide a positive displacement pump with a bypass relief valve which operates to prevent damage to the pump in the event that flow of liquid from the outlet of the pump is blocked while the pump is running.

In the event that the flow of liquid from the outlet of a positive displacement pump is blocked completely, it is necessary that the entire flow of liquid produced by the pump be bypassed through the relief valve. The operating characteristics of an ordinary pressure relief valve are such that when the outlet line leading from the positive displacement pump is completely blocked so that the entire output of the pump must be bypassed through the relief valve, the back pressure required to hold the valve wide open to accommodate the entire output of the pump is substantially greater than the pressure that was required to start the opening of the valve. The excessive back pressure that is imposed upon the pump by an ordinary bypass relief valve when the valve is wide open is due to the fact that the spring which normally holds the valve closed must be substantially compressed when the valve is completely opened. This excessive back pressure places the pump under a severe load and causes wear of the pump.

Various types of bypass relief valves have been designed with a view to decreasing the back pressure exerted by the valve when the valve is wide open. However, such valves and the mechanism required to operate them have been relatively complex, so that they have been expensive and liable to get out of order. Most of such valves have the further disadvantage that they rely in part upon the kinetic energy of the flowing liquid to hold the valve open. The use of kinetic energy to hold the valve open has been found to give unpredictable results. Also, when a positive displacement pump is operating at a slow speed, the kinetic energy of the flowing liquid is relatively low so that a relief valve which depends upon the kinetic energy of the liquid will exert a relatively high back pressure under such conditions.

A further complication arises when a positive displacement pump is used for a liquefied petroleum gas such as propane. In such a case it is customary to provide the pump with two separate bypass relief valves. One of the two relief valves is designed to operate in the usual manner so as to open whenever the outlet line leading from the pump is blocked so as to cause an increase in pressure on the outlet side of the pump. This relief valve leads to a line which conducts the liquefied petroleum gas back to the supply tank. The second bypass relief valve in such an installation is designed to open at a somewhat higher pressure than the pressure that is required to operate the first relief valve. Thus the second relief valve will remain closed when the first relief valve is open and is conducting the entire output of the pump back to the supply tank. The second bypass relief valve is a safety valve which opens to prevent damage to the pump in the event that a valve in the line leading from the first relief valve is inadvertently left shut so as to prevent the liquid from flowing through the first relief valve. If that should occur, the pressure on the outlet side of the positive displacement pump would increase to a value high enough to cause the second bypass relief valve to open. The second bypass relief valve is connected to lead the liquid directly to the inlet of the pump.

In such an installation it is desirable to conduct the bypass liquefied petroleum gas back to the supply tank, rather than to recirculate the liquefied petroleum gas through the pump, so that the second relief valve is designed to open only in the event that the flow of liquid back to the supply tank through the first relief valve is blocked. When the liquefied petroleum gas is being bypassed directly to the inlet of the pump, through the second relief valve, the liquid quickly turns to vapor and rapid wear of the pump occurs. At the same time the vaporization of the liquid causes the pump to become "vapor bound," so that it may be necessary to prime the pump with liquid before it can be placed again in normal operation.

When two such bypass relief valves are employed, the existence of a high back pressure when the first relief valve is wide open is particularly undesirable, because the second bypass relief valve or safety valve must be designed to open at a still higher pressure.

The principal object of the invention is to provide a positive displacement pump having a bypass relief valve of very simple construction which, when wide open to accommodate the entire output of the pump, exerts a back pressure that is not substantially greater than the pressure required to start the opening of the valve, and which may function as a dual relief valve for liquefied petroleum gas having a primary outlet and a secondary outlet.

More specific objects and advantages are apparent from the following description, in which reference is had to the accompanying drawings illustrating preferred embodiments of the invention.

In the drawings:

FIG. 1 is a vertical section of a positive displacement pump embodying the present invention;

FIG. 2 is a fragmentary vertical section of the pump as modified to incorporate a dual-purpose relief valve for liquefied petroleum gas;

FIG. 3 is a fragmentary vertical section of a further modification incorporating a duel-purpose relief valve.

These specific drawings and the specific description that follows merely disclose and illustrate and are not intended to limit the invention.

In the specific embodiment shown in FIG. 1 the pump 11 is a positive displacement pump of the rotary sliding vane type having an inlet port 12 and an outlet port 13. A shaft 14, extending transversely through the pump, carries a cylindrical rotor 15 which is eccentrically located in a rotor chamber 16.

An interior partition 17 which fits closely against the top of the rotor 15 forms the upper side of the rotor chamber 16, and the lower portion 18 of the pump housing forms the lower side of the rotor chamber.

The rotor 15 has a plurality of radial slots 19 extending parallel to the shaft 14 in which are located sliding vanes 20 that cooperate with the exterior surface of the rotor 15 and the lower portion 18 of the pump housing to provide a series of pockets 21 in which fluid is transported from the inlet port 12 toward the outlet port 13 of the pump.

At the base of each slot 19 is a chamber 22 extending axially through the rotor 15. A radial groove 23 is provided in the forward face of each vane 20 to afford free communication from each chamber 22 to the exterior of the rotor 15. The grooves 23 prevent the occurrence in the chambers 22 of a vapor or liquid lock which would interfere with free movement of the vanes 20. Also, while each vane is in its lowermost or active position, the pressure built up in the pocket 21 ahead of the vane is communicated to the chamber 22 behind the vane and tends to hold the vane against the lower portion 18 of the pump housing.

Each vane 20 is connected to the diametrically opposite vane by a push rod 24 extending through the rotor 15, so that as each vane is pushed inward by contact with the wall of the rotor chamber 16, the diametrically opposite vane is pushed outward to keep it in contact with the wall of the chamber.

In the upper portion of the pump 11 is provided a valve chamber having a high pressure end 25 in open communication with the pump outlet 13 and a low pressure end 26 in open communication with the pump inlet 12. The high pressure end 25 of the valve chamber is separated from the low pressure end 26 by a valve member which includes a body portion 27 that has a relatively close sliding fit in an intermediate portion of the valve chamber.

Formed in the wall of the high pressure end 25 of the valve chamber is a valve seat 28. The body portion 27 of the valve member is provided with an extension 29 of reduced diameter, the end of which is engageable with the valve seat 28 in order to close the bypass valve.

A cup 30 provided with a sealing gasket 31 is screwed into the outer wall of the low pressure end 26 of the valve chamber. Slidably mounted in the cup 30 is a button 32 the position of which is determined by a screw 33 provided with a lock nut 34. A sealing gasket 35 surrounding the button 32 prevents liquid from leaking past the screw 33.

The button 32 supports one end of a relatively light spring 36, and the other end of the spring is seated in a recess 37 provided in the body portion 27 of the valve member so that the spring 36 tends to hold the extension 29 of the valve member against the seat 28.

At the same time, the pressure created by the pump tends to open the valve because the cross sectional area of the extension 29 is less than the cross sectional area of the body portion 27 of the valve, and the pressure on the outlet side of the pump acts upon the differential area. The difference between the cross sectional area of the body portion 27 and the cross sectional area of the extension 29 is small enough so that the pressure normally existing on the outlet side of the pump, acting upon the differential area, is not sufficient to open the valve against the force exerted by the relatively weak spring 36.

If the flow of liquid from the outlet 13 should be blocked while the pump is running, however, the valve body 27 will immediately move away from the seat 28, because as soon as the pressure on the outlet side of the pump begins to increase it will exert a pressure on the differential area which is sufficient to overcome the force exerted by the weak spring 36. Then as soon as the extension 29 moves away from the seat 28, the pressure on the outlet side of the pump will begin to act upon the exposed end of the extension 29, thus increasing the area upon which the pressure tending to open the valve is applied. Because of the increased area upon which the outlet pressure acts when the valve is open, the outlet pressure that exists when the valve is wide open to accommodate the entire output of the pump, in pounds per square inch, is not substantially greater than the pressure that was required to start the opening of the valve. That is true because when the valve is open, the outlet pressure acts upon the area at the end of the extension 29, and the outlet pressure acting upon this additional area supplies force to produce further compression of the weak spring 36 without any substantial increase in the pounds per square inch of pressure on the outlet side of the pump.

When the valve is open in the apparatus shown in FIG. 1, the liquid flows from the high pressure end 25 of the valve chamber radially inward past the valve seat 28, and then flows directly to the low pressure end 26 of the valve chamber via an internal passage 38 which extends longitudinally through the valve member.

The construction shown in FIG. 1 has the advantage that the liquid flowing through the internal passage 38 is substantially unimpeded so that the kinetic energy or momentum of the flowing liquid is not used to create a force tending to hold the valve open. Thus the only force tending to hold the valve open is the force created by the outlet pressure acting upon the valve member, and consequently the outlet pressure required to hold the valve open is substantially the same at various operating speeds of the pump.

The construction shown in FIG. 1 thus provides a bypass relief valve which operates reliably to prevent excessive pressure from occurring on the outlet side of the pump even when the pump is operating at a slow speed and the relief valve is bypassing the entire output of the pump.

An important advantage of the present invention is that the area upon which the outlet pressure acts in tending to open the valve may be made small relative to the size of the opening through which the liquid flows when the valve is opened. For example, in the structure shown in FIG. 1, the area upon which the outlet pressure acts intending to open the valve is equal to the difference between the cross sectional area of the valve body 27 and the cross sectional area of the extension 29, and this differential area may be made as small as desired. In the practice of the invention, the spring that holds the valve closed against the normal outlet pressure of the pump may be a relatively weak spring, because the outlet pressure tending to open the valve operates upon a relatively small area of the valve. Then even though the area of the end of the extension 29 is relatively small, it is still a large fraction of the total cross sectional area of the hollow valve portion 27. When the valve opens, therefore, the application of the outlet pressure to the end of the extension 29 causes a relatively large percentage increase in the area of the valve upon which the outlet pressure is acting, thus causing a substantial increase in the force tending to open the valve and causing substantial compression of the spring. It is for this reason that the pressure at the outlet of the pump, in pounds per square inch, is not substantially greater when the valve is wide open than it is when the valve is just starting to open.

In contrast, an ordinary bonnet-type relief valve has the disadvantage that the area which is subjected to the outlet pressure tending to open the valve cannot be less than the cross sectional area of the passage through which liquid enters the valve. Accordingly, the pressure tending to open a bonnet-type relief valve always acts on a relatively large area of the valve, so that a relatively stiff spring is required to hold the valve closed against normal outlet pressure. When such a valve is wide open, the relatively stiff spring is substantially compressed and therefore exerts a substantially increased force so that a very high pressure must be built up on the outlet side of the pump in order to hold the relief valve open when the valve is bypassing the entire output of the pump.

FIG. 2 shows the structure of FIG. 1 as modified for handling liquefied petroleum gas such as propane. In the construction shown in FIG. 2, the valve seat 28 surrounds an outlet 39 into which is threaded a return line 40 for leading the liquefied petroleum gas back to the supply tank. FIG. 2 shows the position of the parts after the valve has opened to relieve the pressure on the outlet side of the pump by returning the liquefied petroleum gas to the supply tank through the line 40. In the construction shown in FIG. 2, the valve moves to this open position whenever the discharge of liquid from the pump is blocked to cause the pressure on the outlet side to rise above the normal operating pressure.

The operation illustrated in FIG. 2 is the same as the operation of the valve shown in FIG. 1 except that the discharged liquid flows into the return line 40 instead of flowing directly through the valve body 27 to the low pressure end 26 of the valve chamber. As in FIG. 1, the outlet pressure before the valve opens acts upon an area equal to the difference between the cross sectional area of the valve body 27 and the cross sectional area of extension 29. Then after the valve opens as shown in FIG. 2, the outlet pressure also acts upon the area at the end of the extension 29. Because of the greater area upon which the outlet pressure acts when the valve is opened, the outlet pressure in pounds per square inch is not substantially greater when the valve is wide open than it is when the valve is just beginning to open.

Although the return line 40 ordinarily is in open communication with the inlet side of the pump, the passage 38 in the valve body 27 ordinarily is not in open communication with the inlet side of the pump because the end of this passage is sealed by a disc 41 which is held by means of the spring 36 in the bottom of the recess 37.

In order to permit the relief valve shown in FIG. 2 to operate as a dual-function valve, having two different outlets, the passage 38 in the valve body 27 is provided with a plurality of lateral apertures 42 which lead to a relatively wide groove 43 that extends around the circumference of the valve body 27. Ordinarily it is desirable that all of the liquefied petroleum gas bypassed by the valve be returned to the supply tank through the line 40, because the liquid would become vaporized if it were bypassed directly to the low pressure end 26 of the valve chamber. However, the valve shown in FIG. 2 functions as a safety valve whenever the outlet line from the pump and the return line 40 are both blocked, for example by closure of valves in both lines. When that occurs, the further increase in pressure on the outlet side of the pump causes the spring 36 to be compressed further until the groove 43 surrounding the valve body 27 comes into open communication with the low pressure end 26 of the valve chamber.

Thus the relief valve shown in FIG. 2, which normally opens only to the position in which it is shown, is capable of functioning as a safety valve upon further increase in the pressure on the outlet side of the pump, by further movement of the valve toward open position.

FIG. 2 shows an additional spring 44 which may be provided if desired. The spring 44 is shorter than the spring 36, and is not compressed until the valve body 27 approaches the position at which the groove 43 is exposed to the low pressure end 26 of the valve chamber. The purpose of the additional spring 44 is to insure that the valve will not bypass liquid petroleum gas directly to the low pressure end 26 of the valve chamber under normal operating pressures, but only under excessive pressures sufficient to compress both of the springs 36 and 44.

The bypass valve shown in FIG. 3 operates in the same manner as the bypass valve shown in FIG. 2, but the location of the return line leading back to the supply tank is slightly different in the two figures.

In the construction shown in FIG. 3, opening of the valve permits the liquefied petroleum gas to flow into the passage 38 in the interior of the valve member, which is normally in open communication with the supply tank through the apertures 42, the circumferential groove 43, an opening 45 which normally registers with the groove 43, and a return line 46 leading to the supply tank.

FIG. 3 illustrates the secondary or safety function of the valve in that it shows the position which the valve assumes when both the outlet line from the pump and the return line to the supply tank are blocked. FIG. 3 shows the position that the valve assumes after excessive pressure on the outlet side of the pump has caused the valve to move past its normal position to an extreme position in which the circumferential groove 43 is no longer in communication with the outlet 45 but is in direct communication with the low pressure end 26 of the valve chamber.

The structures shown in the drawings may be modified to meet various requirements. For example, it is not necessary that the bypass valve be constructed as an integral part of the pump in the manner shown in the drawings. If it is desired to apply the present invention to an existing pump, the bypass valve may be constructed as a separate unit and connected by piping to the inlet line and the outlet line of the pump.

An important feature which is common to the valve structures shown in FIGS. 1, 2 and 3 is a flange 47 surrounding the low pressure end of the valve body, which has a close sliding fit in a counterbore 48. The purpose of this construction is to retard the final portion of the closing movement of the valve to prevent the valve from striking a hammer blow against its seat, without correspondingly retarding the opening movement of the valve.

Since the pressure existing across the present valve when the valve is wide open, in pounds per square inch, is not substantially greater than the pressure existing across the valve when the valve is closed, the present valve is sensitive in its action, and will close with only a slight decrease in the pressure on the outlet side of the pump. Thus the valve closes quickly when the pressure drops on the outlet side of the pump, and it is important to retard the final portion of the closing movement of the valve so as to prevent the valve from striking its seat with a hammer blow.

During the final portion of the closing movement of the valve, the flange 47 acts as a piston tending to compress liquid in the counterbore 48. The liquid is incompressible, however, so that the final portion of the closing movement of the valve takes place slowly as the liquid trapped in the counterbore 48 escapes through the relatively small clearance between the flange 47 and the counterbore 48. This provides a positive retarding action on the valve, and the speed at which the valve moves during the final portion of its closing movement is determined entirely by the clearance which is provided between the flange 47 and the counterbore 48.

During the opening movement of the valve, however, the flange 47 does not have a positive retarding action in that the speed of opening of the valve is not limited to the rate at which liquid can flow through the clearance between the flange 47 and the counterbore 48.

The flange 47 does not limit the speed at which the valve can open, because very rapid opening of the valve merely causes a vacuum to be formed in the counterbore 48.

An important advantage of this construction is that the outer side of the flange 47 is exposed to the inlet pressure of the pump, which is much lower than the outlet pressure of the pump. Thus the additional force required to pull a vacuum in the counterbore 48, during rapid opening of the valve, is merely the amount of force required to overcome the relatively low inlet pressure acting upon the relatively small area of the flange 47. Hence the small amount of additional force required to pull a vacuum in the counterbore 48 during rapid opening of the valve is readily provided by the relatively high outlet pressure tending to open the valve.

In this way the flange 47, acting in the counterbore 48, positively retards the final portion of the closing movement of the valve so as to prevent the valve from hammering against its seat, but does not materially retard the opening movement of the valve.

Having described the invention, I claim:

1. A positive displacement pump having a relief valve for bypassing liquid from the outlet side to the inlet side of the pump to limit the pressure on the outlet side, comprising a valve chamber having a cylindrical portion, a valve member having a cylindrical portion that has a sliding fit in such portion of the valve chamber so as to separate one end of the valve chamber from the other end, and an open connection between one end of the valve chamber and the inlet side of the pump, wherein the improvement comprises an open connection between the other end of the valve chamber and the outlet side of the pump, a valve seat which is located in the end wall of such other end of the valve chamber and forms a connection between such other end of the valve chamber and the inlet side of the pump, an extension on the valve member which is of lesser transverse sectional area than said cylindrical portion of the valve member and which has an end portion engageable with the seat to close the connection between such other end of the valve chamber and the inlet side of the pump, and a spring which holds the extension against the seat in opposition to normal pump outlet pressure acting upon the difference between the transverse cross sectional area of said cylindrical portion of said valve member and that of the extension and which is weak enough so that when the entire output of the pump is flowing through the valve seat, the unit pressure acting upon the increased area of said extension end portion to hold the extension displaced from the seat is not substantially greater than the unit pressure acting upon the differential area which was required to start the displacement of the extension from the seat.

2. A positive displacement pump according to claim 1 wherein the valve member has an internal passage which leads from the end of the extension that is engageable with the valve seat and which forms part of a connection to the inlet side of the pump.

3. A positive displacement pump according to claim 2 wherein the internal passage in the valve member is in open communication with the inlet side of the pump.

4. A positive displacement pump according to claim 3 wherein the internal passage extends longitudinally through the valve member to the portion of the valve chamber which is in open communication with the inlet side of the pump.

5. A positive displacement pump according to claim 1 wherein the valve seat forms a connection to a passage which is normally in open communication with a source of supply of liquid on the inlet side of the pump.

6. A positive displacement pump according to claim 5 wherein the passage extends through the interior of the valve member.

7. A positive displacement pump according to claim 5 wherein the valve member has an internal passage which leads from the end of the extension that is engageable with the valve seat and which has a lateral port in the cylindrical portion of the valve member that has a sliding fit in the valve chamber, such port, upon extreme displacement of the extension away from the seat, opening into the end of the valve chamber that has an open connection with the inlet side of the pump, whereby the valve serves to relieve pressure primarily by returning liquid to the source of supply and secondarily by bypassing liquid from one end of the valve chamber to the other.

8. A positive displacement pump according to claim 1 wherein the end of the valve member remote from the seat is surrounded by a flange which has a close sliding fit in a counterbore in the valve chamber and which retards the final portion of the closing movement of the valve by trapping liquid in the counterbore.

9. A relief valve for bypassing liquid from the outlet side to the inlet side of a positive displacement pump to limit the pressure on the outlet side, comprising a valve chamber having a cylindrical portion, and a valve member having a cylindrical portion that has a sliding fit in such portion of the valve chamber so as to separate one end of the valve chamber from the other end, one end of the valve chamber being adapted to be connected directly to the inlet side of the pump and the other end of the valve chamber being adapted to be connected directly to the outlet side, wherein the improvement comprises a valve seat which is located in the end wall of such other end of the valve chamber and is adapted to form a connection between such other end of the valve chamber and the inlet side of the pump, an extension on the valve member which is of lesser transverse sectional area than said cylindrical portion of the valve member and which has an end portion which is engageable with the seat to close the connection between such other end of the valve chamber and the inlet side of the pump, and a spring which holds the extension against the seat in opposition to normal pump outlet pressure acting upon the difference between the transverse cross sectional area of said cylindrical portion of said valve member and that of said extension and which is weak enough so that when the entire output of the pump is flowing through the valve seat, the unit pressure acting upon the increased area at said end portion to hold the extension displaced from the seat is not substantially greater than the unit pressure acting upon the differential area which was required to start the displacement of the extension from the seat.

10. A relief valve according to claim 9 wherein the end of the valve member remote from the seat is surrounded by a flange which has a close sliding fit in a counterbore in the valve chamber and which retards the final portion of the closing movement of the valve by trapping liquid in the counterbore.

References Cited

UNITED STATES PATENTS

| 3,021,790 | 2/1962 | Brunson | 103—42 |
| 3,059,580 | 10/1962 | Farrell et al. | 103—42 |
| 3,106,166 | 10/1963 | Tomasko et al. | 103—42 X |
| 3,140,049 | 7/1964 | Norstrud et al. | 103—42 X |
| 3,146,720 | 9/1964 | Henry | 103—42 |
| 3,195,556 | 7/1965 | Norstrud et al. | 137—115 |
| 3,266,425 | 8/1966 | Brunson | 103—41 |
| 3,270,675 | 9/1966 | Ajam | 103—42 |

ROBERT M. WALKER, *Primary Examiner.*

DONLEY J. STOCKING, *Examiner.*

WARREN J. KRAUSS, *Assistant Examiner.*